(12) United States Patent
Hasegawa

(10) Patent No.: US 11,752,778 B2
(45) Date of Patent: Sep. 12, 2023

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventor: Tomonaga Hasegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 17/443,467

(22) Filed: Jul. 27, 2021

(65) Prior Publication Data
US 2022/0032651 A1    Feb. 3, 2022

(30) Foreign Application Priority Data
Jul. 29, 2020    (JP) .................................. 2020-128001

(51) Int. Cl.
| | | |
|---|---|---|
| *B41J 3/407* | (2006.01) | |
| *B41J 2/045* | (2006.01) | |
| *B25J 11/00* | (2006.01) | |
| *B25J 9/16* | (2006.01) | |
| *B25J 15/00* | (2006.01) | |

(52) U.S. Cl.
CPC .......... *B41J 3/4073* (2013.01); *B25J 9/1661* (2013.01); *B25J 9/1697* (2013.01); *B25J 11/0075* (2013.01); *B25J 15/0019* (2013.01); *B41J 2/04541* (2013.01); *B41J 2203/011* (2020.08)

(58) Field of Classification Search
None
See application file for complete search history.

(56) References Cited

U.S. PATENT DOCUMENTS

| | | | |
|---|---|---|---|
| 2009/0167817 A1* | 7/2009 | Orr ....................... | B29C 64/106 347/37 |
| 2014/0063096 A1 | 3/2014 | Pitz et al. | |
| 2016/0052312 A1* | 2/2016 | Pitz ........................ | B41J 3/4073 347/37 |

FOREIGN PATENT DOCUMENTS

| | | |
|---|---|---|
| JP | 2014-050832 A | 3/2014 |
| JP | 2016-077971 A | 5/2016 |

* cited by examiner

*Primary Examiner* — Erica S Lin
(74) *Attorney, Agent, or Firm* — WORKMAN NYDEGGER

(57) ABSTRACT

Provided is a three-dimensional object printing apparatus, in which a printing operation for a workpiece includes: a first pass in which liquid is ejected toward a first region of the workpiece; a second pass in which the liquid is ejected toward a second region that partially overlaps the first region of the workpiece; a third pass in which the liquid is ejected toward a third region of the workpiece; a fourth pass in which the liquid is ejected toward a fourth region that partially overlaps the third region of the workpiece, the curvature of a surface including the first region and the second region is larger than the curvature of a surface including the third region and the fourth region, and an overlapping width between the first region and the second region is smaller than an overlapping width between the third region and the fourth region.

15 Claims, 8 Drawing Sheets

THREE-DIMENSIONAL OBJECT PRINTING APPARATUS AND THREE-DIMENSIONAL OBJECT PRINTING METHOD

The present application is based on, and claims priority from JP Application Serial Number 2020-128001, filed Jul. 29, 2020, the disclosure of which is hereby incorporated by reference herein in its entirety.

BACKGROUND

1. Technical Field

The present disclosure relates to a three-dimensional object printing apparatus and a three-dimensional object printing method.

2. Related Art

A three-dimensional object printing apparatus that performs printing on a surface of a three-dimensional object by using an ink jet method has been known. For example, an apparatus described in JP-A-2014-50832 includes a robot arm and a print head fixed to an end portion of the robot arm. In JP-A-2014-50832, a curved surface of a vehicle is described as an object to be printed.

SUMMARY

JP-A-2014-50832 does not specifically disclose a case of printing an image having a width larger than that of an image that can be printed with one pass of the print head. In a general printing apparatus that performs printing on a planar work such as paper, an image having a large width is formed by contiguously arranging print images obtained with a plurality of passes of the print head. Here, parts of images of adjacent passes overlap each other.

However, in a case in which an overlapping width between the images of the adjacent passes is set to be the same as that in the general printing apparatus, when a surface that is a printing target has a plurality of portions having different curvatures, a printing error at seams may become conspicuous at a portion having a small curvature. When the overlapping width is simply increased to prevent such a printing error from being conspicuous, a printing time is increased. In this regard, there is a demand for improving a printing speed without making a printing error conspicuous when a surface that is a printing target has a plurality of portions having different curvatures.

According to an aspect of the present disclosure, a three-dimensional object printing apparatus includes: a liquid ejecting head that ejects a liquid toward a three-dimensional work having a curved surface; and a moving mechanism that changes a relative position and posture of the liquid ejecting head with respect to the workpiece, in which a printing operation for the workpiece includes: a first step of performing a first pass in which the moving mechanism moves the liquid ejecting head relative to a first region of the workpiece and the liquid ejecting head ejects the liquid; a second step of performing a second pass in which the moving mechanism moves the liquid ejecting head relative to a second region that partially overlaps the first region of the workpiece and the liquid ejecting head ejects the liquid; a third step of performing a third pass in which the moving mechanism moves the liquid ejecting head relative to a third region of the workpiece and the liquid ejecting head ejects the liquid; and a fourth step of performing a fourth pass in which the moving mechanism moves the liquid ejecting head relative to a fourth region that partially overlaps the third region of the workpiece and the liquid ejecting head ejects the liquid, the curvature of a surface including the first region and the second region is larger than the curvature of a surface including the third region and the fourth region, and an overlapping width between the first region and the second region is smaller than an overlapping width between the third region and the fourth region.

According to another aspect of the present disclosure, a three-dimensional object printing apparatus includes: a liquid ejecting head that ejects a liquid toward a three-dimensional work having a curved surface; and a moving mechanism that changes a relative position and posture of the liquid ejecting head with respect to the workpiece, in which a printing operation for the workpiece includes: a first step of performing a first pass in which the moving mechanism moves the liquid ejecting head relative to a first region of the workpiece and the liquid ejecting head ejects the liquid; a second step of performing a second pass in which the moving mechanism moves the liquid ejecting head relative to a second region that partially overlaps the first region of the workpiece and the liquid ejecting head ejects the liquid; a third step of performing a third pass in which the moving mechanism moves the liquid ejecting head relative to a third region of the workpiece and the liquid ejecting head ejects the liquid; and a fourth step of performing a fourth pass in which the moving mechanism moves the liquid ejecting head relative to a fourth region that partially overlaps the third region of the workpiece and the liquid ejecting head ejects the liquid, an angle formed by a direction in which the liquid is ejected from the liquid ejecting head in the first step and a direction in which the liquid is ejected from the liquid ejecting head in the second step is larger than an angle formed by a direction in which the liquid is ejected from the liquid ejecting head in the third step and a direction in which the liquid is ejected from the liquid ejecting head in the fourth step, and an overlapping width between the first region and the second region is smaller than an overlapping width between the third region and the fourth region.

According to another aspect of the present disclosure, in a three-dimensional object printing method for performing printing by using a liquid ejecting head that ejects a liquid toward a three-dimensional work having a curved surface, a printing operation for the workpiece includes: a first step of performing a first pass in which the liquid ejecting head is moved relative to a first region of the workpiece and ejects the liquid; a second step of performing a second pass in which the liquid ejecting head is moved relative to a second region that partially overlaps the first region of the workpiece, and ejects the liquid; a third step of performing a third pass in which the liquid ejecting head is moved relative to a third region of the workpiece and ejects the liquid; and a fourth step of performing a fourth pass in which the liquid ejecting head is moved relative to a fourth region that partially overlaps the third region of the workpiece, and ejects the liquid, a curvature of a surface including the first region and the second region is larger than a curvature of a surface including the third region and the fourth region, and an overlapping width between the first region and the second region is smaller than an overlapping width between the third region and the fourth region.

DESCRIPTION OF EXEMPLARY EMBODIMENTS

Figure 1:
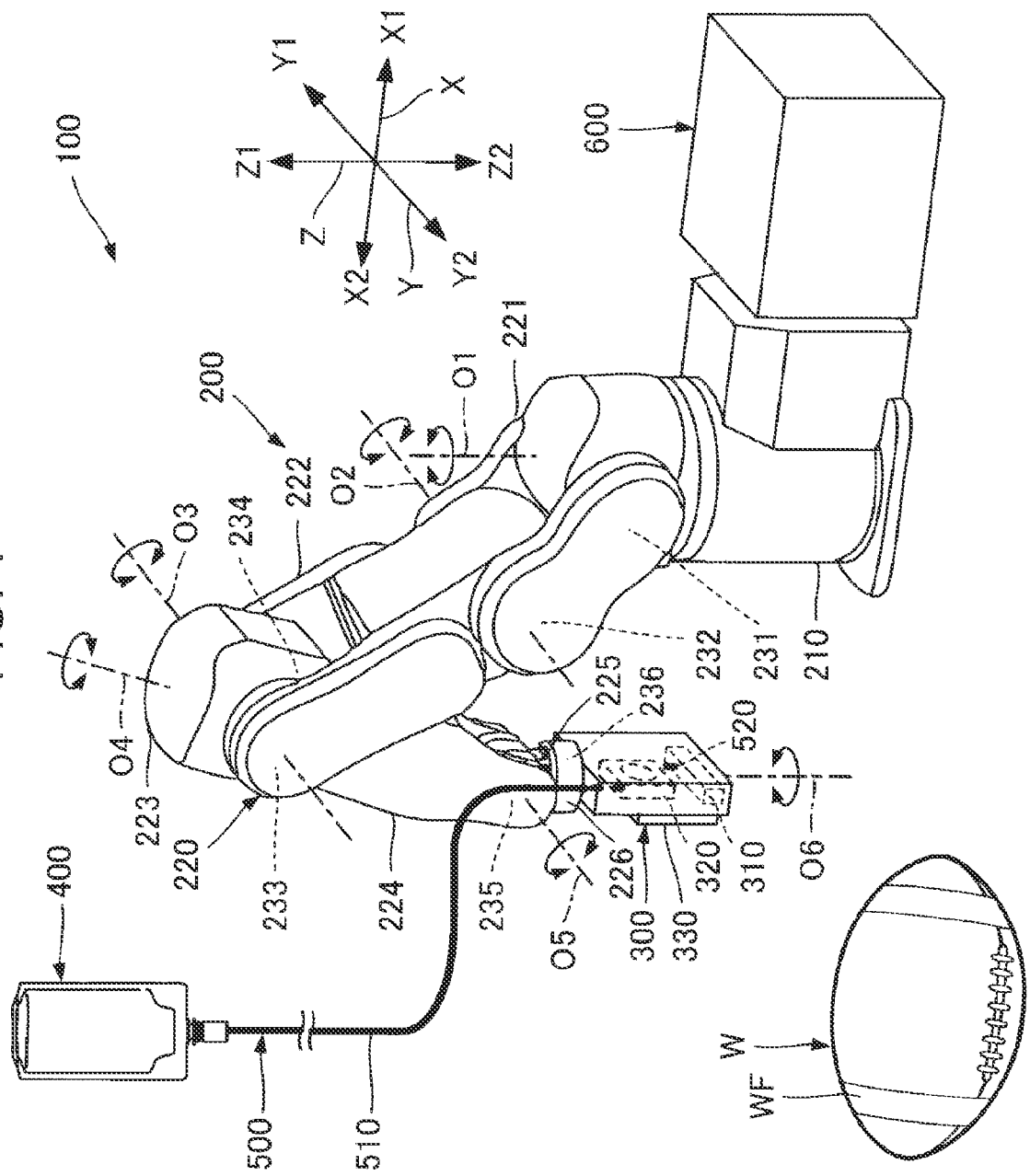
FIG. 1 is a schematic perspective view illustrating a three-dimensional object printing apparatus according to an embodiment.

Hereinafter, exemplary embodiments according to the present disclosure will be described with reference to the accompanying drawings. Note that the dimensions or the scale of each component may differ appropriately from actual dimensions or scales, and some portions are schematically illustrated in the drawings to facilitate understanding. Further, the scope of the present disclosure is not limited to the embodiments unless otherwise specified in the following description.

In the following description, an X axis, a Y axis, and a Z axis that intersect one another are appropriately used. Further, a direction along the X axis is referred to as an X1 direction, and a direction opposite to the X1 direction is referred to as an X2 direction. Similarly, directions opposite to each other along the Y axis are referred to as a Y1 direction and a Y2 direction. Further, directions opposite to each other along the Z axis are referred to as a Z1 direction and a Z2 direction.

Here, the X axis, the Y axis, and the Z axis are coordinate axes of a base coordinate system set in a space in which a workpiece W and a base 210 to be described later are installed. Typically, the Z axis is a vertical axis, and the Z2 direction corresponds to a downward direction along the vertical axis. Note that the Z axis does not have to be a vertical axis. Typically, the X axis, the Y axis, and the Z axis are orthogonal to one another. However, the X axis, the Y axis, and the Z axis are not limited thereto, and do not have to be orthogonal to one another. For example, it is sufficient that the X axis, the Y axis, and the Z axis intersect one another within an angle range of 80° to 100°.

1. Embodiment 1-1. Overview of Three-Dimensional Object Printing Apparatus

FIG. 1 is a schematic perspective view illustrating a three-dimensional object printing apparatus 100 according to an embodiment. The three-dimensional object printing apparatus 100 is an apparatus that performs printing on a surface of a three-dimensional work W by using an ink jet method. The workpiece W has a curved surface WF having a variable curvature.

In the example illustrated in FIG. 1, the workpiece W is a rugby ball having a prolate spheroid shape with a major axis AX. In the present embodiment, the workpiece W is arranged so that the major axis AX is parallel to the X axis. Note that the workpiece W is not limited to the rugby ball. Here, the form of the workpiece W such as the shape or size is not limited to that illustrated in FIG. 1, but may be arbitrary, as long as the workpiece W has a curved surface having a plurality of portions having different curvatures. Further, the surface of the workpiece W may include only a curved surface, or may include other surfaces such as a flat surface, a stepped surface, and a concavo-convex surface, in addition to the curved surface. Further, the installation posture of the workpiece W is not limited to that of the example illustrated in FIG. 1, but may be arbitrary.

In the example illustrated in FIG. 1, the three-dimensional object printing apparatus 100 is an ink jet printer using a vertical articulated robot. Specifically, as illustrated in FIG. 1, the three-dimensional object printing apparatus 100 includes a robot 200, a liquid ejecting head unit 300, a liquid storing unit 400, a supply flow path 500, and a control device 600. Hereinafter, first, the respective parts of the three-dimensional object printing apparatus 100 will be schematically described sequentially.

The robot 200 is an example of a moving mechanism that changes the position and posture of the liquid ejecting head unit 300 with respect to the workpiece W. In the example illustrated in FIG. 1, the robot 200 is a so-called 6-axis vertical articulated robot. Specifically, the robot 200 includes the base 210 and an arm 220.

The base 210 is a stand that supports the arm 220. In the example illustrated in FIG. 1, the base 210 is fixed to an installation surface such as a floor surface that faces the Z1 direction by using a screw or the like. Note that the installation surface to which the base 210 is fixed may be a surface that faces any direction, is not limited to that of the example illustrated in FIG. 1, and may be, for example, a surface of a wall, a ceiling, or a movable carriage.

The arm 220 is a 6-axis robot arm having a proximal end attached to the base 210 and a distal end whose position and posture are three-dimensionally changed with respect to the proximal end. Specifically, the arm 220 includes arms 221, 222, 223, 224, 225, and 226 that are coupled in this order.

The arm 221 is coupled to the base 210 through a joint unit 231 that is rotatable around a first rotational axis O1. The arm 222 is coupled to the arm 221 through a joint unit 232 that is rotatable around a second rotational axis O2. The arm 223 is coupled to the arm 222 through a joint unit 233 that is rotatable around a third rotational axis O3. The arm 224 is coupled to the arm 223 through a joint unit 234 that is rotatable around a fourth rotational axis O4. The arm 225 is coupled to the arm 224 through a joint unit 235 that is rotatable around a fifth rotational axis O5. The arm 226 is coupled to the arm 225 through a joint unit 236 that is rotatable around a sixth rotational axis O6.

In the example illustrated in FIG. 1, each of the joint units 231 to 236 are mechanisms that rotatably couple one of two adjacent arms to the other. Although not illustrated, a driving mechanism that rotates one of two adjacent arms with respect to the other is provided in each of the joint units 231 to 236. The driving mechanism includes, for example, a motor that generates a driving force for the rotation, a decelerator that decelerates and outputs the driving force, and an encoder such as a rotary encoder that detects the angle of the rotation or the like. Note that the driving mechanism corresponds to an arm driving mechanism 230 illustrated in FIG. 2 to be described later.

The first rotational axis O1 is an axis perpendicular to the installation surface (not illustrated) to which the base 210 is fixed. The second rotational axis O2 is an axis perpendicular to the first rotational axis O1. The third rotational axis O3 is an axis perpendicular to the second rotational axis O2. The fourth rotational axis O4 is an axis perpendicular to the third rotational axis O3. The fifth rotational axis O5 is an axis perpendicular to the fourth rotational axis O4. The sixth rotational axis O6 is an axis perpendicular to the fifth rotational axis O5.

Note that, for these rotational axes, being "perpendicular" not only includes a case in which two rotational axes form an angle of exactly 90°, but also a case in which two rotational axes form an angle of 90°±5°. Similarly, being "parallel" not only includes a case in which two rotational axes are exactly parallel to each other, but also includes a case in which one of two rotational axes is inclined at about ±5° with respect to the other.

The liquid ejecting head unit 300 is mounted as an end effector on the distal end of the arm 221 described above, that is, the arm 226.

The liquid ejecting head unit 300 is a mechanism including a liquid ejecting head 310 that ejects ink, which is an example of a liquid, toward the workpiece W. In the present embodiment, the liquid ejecting head unit 300 includes, in addition to the liquid ejecting head 310, a pressure adjustment valve 320 that adjusts the pressure of the ink supplied to the liquid ejecting head 310, and a displacement sensor 330 that measures a distance between the liquid ejecting head 310 and the workpiece W. The liquid ejecting head 310, the pressure adjustment valve 320, and the displacement sensor 330 are fixed to the arm 226 together, and thus, their relative positions and postures are fixed.

The liquid ejecting head 310 will be described in detail later. The pressure adjustment valve 320 is a valve mechanism that is opened or closed according to the pressure of the ink in the liquid ejecting head 310. As the pressure adjustment valve 320 is opened or closed, the ink in the liquid ejecting head 310 is maintained at a negative pressure within a predetermined range. Therefore, stabilization of a meniscus of the ink in a nozzle N of the liquid ejecting head 310 may be achieved. As a result, air bubbles do not enter the nozzle N, and the ink does not spill from the nozzle N.

The displacement sensor 330 is an optical displacement sensor that measures a distance between the liquid ejecting head 310 and the workpiece W. Note that it is sufficient that the displacement sensor 330 is provided as necessary, and the displacement sensor 330 may be omitted. Further, in the example illustrated in FIG. 1, the number of each of the liquid ejecting head 310 and the pressure adjustment valve 320 of the liquid ejecting head unit 300 is one. However, the number of each of the liquid ejecting head 310 and the pressure adjustment valve 320 of the liquid ejecting head unit 300 is not limited to that in the example illustrated in FIG. 1, but may be two or more. Further, the installation positions of the pressure adjustment valve 320 and the displacement sensor 330 are not limited to the arm 226, and may be, for example, another arm or the like.

The liquid storing unit 400 is a container that stores the ink. The liquid storing unit 400 is, for example, a bag-shaped ink pack formed of a flexible film. The ink stored in the liquid storing unit 400 is, for example, ink containing a coloring material such as dye and pigment. Note that the type of the ink stored in the liquid storing unit 400 is not limited to the ink containing a coloring material, and may be, for example, ink containing a conductive material such as metal powder. Further, the ink may have curability such as UV curability. When the ink has curability such as UV curability, for example, an ultraviolet irradiation mechanism is mounted on the liquid ejecting head unit 300.

In the example illustrated in FIG. 1, the liquid storing unit 400 is fixed to a wall, a ceiling, a pillar, or the like, such that the liquid storing unit 400 is always positioned more toward the Z1 direction than the liquid ejecting head 310 is. That is, the liquid storing unit 400 is positioned above a region where the liquid ejecting head 310 moves in the vertical direction. Therefore, it is possible to supply the ink from the liquid storing unit 400 to the liquid ejecting head 310 with a predetermined pressurization force, without using a mechanism such as a pump.

Note that it is sufficient that the liquid storing unit 400 is installed in a space where the ink can be supplied from the liquid storing unit 400 to the liquid ejecting head 310 at a predetermined pressure, and the liquid storing head 310 may be positioned below the liquid ejecting head 310 in the vertical direction. In this case, it is sufficient that the ink is supplied from the liquid storing unit 400 to the liquid ejecting head 310 at a predetermined pressure by using, for example, a pump.

The supply flow path 500 is a flow path through which the ink is supplied from the liquid storing unit 400 to the liquid ejecting head 310. The pressure adjustment valve 320 is provided in the middle of the supply flow path 500. Therefore, even when a positional relationship between the liquid ejecting head 310 and the liquid storing unit 400 is changed, it is possible to reduce variation in pressure of the ink in the liquid ejecting head 310.

The supply flow path 500 is divided into an upstream flow path 510 and a downstream flow path 520 by the pressure adjustment valve 320. That is, the supply flow path 500 includes the upstream flow path 510 that makes the liquid storing unit 400 and the pressure adjustment valve 320 be in communication with each other, and the downstream flow path 520 that makes the pressure adjustment valve 320 and the liquid ejecting head 310 be in communication with each other.

Each of the upstream flow path 510 and the downstream flow path 520 is formed with, for example, an internal space of a tube. Here, the tube used for the upstream flow path 510 is formed of, for example, an elastic material such as a rubber material or an elastomer material, and has flexibility. As the upstream flow path 510 is formed by using the tube having flexibility as described above, a change in a relative position relationship between the liquid storing unit 400 and the pressure adjustment valve 320 is allowed. Accordingly, even when the position or posture of the liquid ejecting head 310 is changed in a state where the position and posture of the liquid storing unit 400 are fixed, it is possible to supply the ink from the liquid storing unit 400 to the pressure adjustment valve 320. Meanwhile, a tube used for the downstream flow path 520 does not have to have flexibility. Therefore, the tube used for the downstream flow path 520 may be formed of an elastic material such as a rubber material or an elastomer material, or may be formed of a hard material such as a resin material.

Note that a part of the upstream flow path 510 may be formed using a member that does not have flexibility. Further, the downstream flow path 520 is not limited to be formed by using the tube. For example, a part of or the entire downstream flow path 520 may include a distribution flow path for distributing the ink from the pressure adjustment valve 320 to a plurality of portions, or may be formed integrally with the liquid ejecting head 310 or the pressure adjustment valve 320.

The control device 600 is a device that controls driving of each part of the three-dimensional object printing apparatus 100. Here, the control device 600 controls the driving of the liquid ejecting head 310 and the robot 200. The control device 600 will be described in detail together with an electrical configuration of the three-dimensional object printing apparatus 100 to be described below.

1-2. Electrical Configuration of Three-Dimensional Object Printing Apparatus

Figure 2:
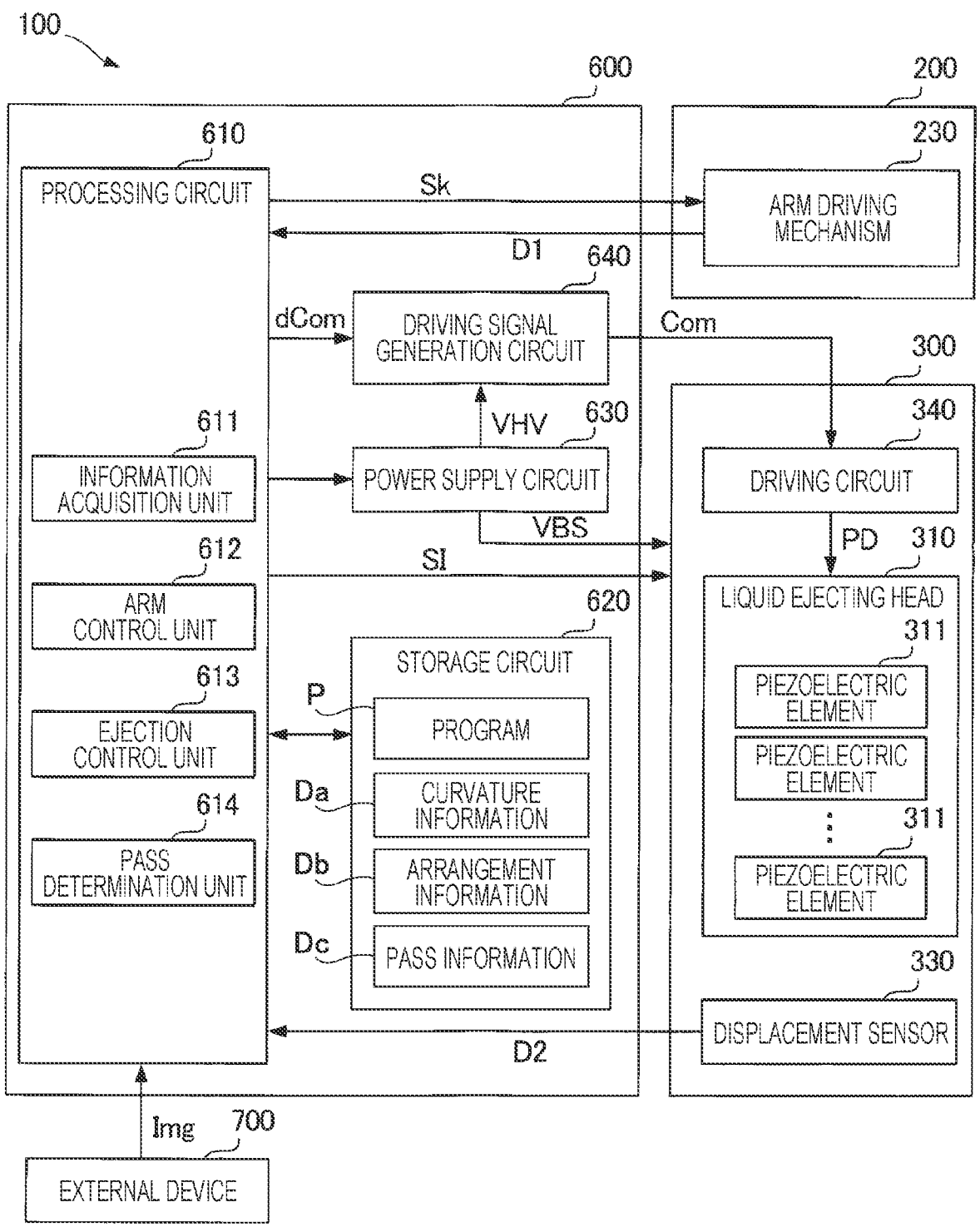
FIG. 2 is a block diagram illustrating an electrical configuration of the three-dimensional object printing apparatus according to an embodiment.

FIG. 2 is a block diagram illustrating the electrical configuration of the three-dimensional object printing apparatus 100 according to an embodiment. FIG. 2 illustrates electrical components among the components of the three-dimensional object printing apparatus 100. As illustrated in FIG. 2, the control device 600 includes a processing circuit 610, a storage circuit 620, a power supply circuit 630, and a driving signal generation circuit 640.

Note that hardware components included in the control device 600 to be described below may be appropriately divided. For example, hardware components other than an arm control unit 612 and the driving signal generation circuit 640 of the control device 600 may be individually provided. Further, some or all of the functions of the control device 600 may be implemented by an external device 700 coupled to the control device 600, or may be implemented by another external device such as a personal computer (PC) connected to the control device 600 through a network such as a local area network (LAN) or the Internet.

The processing circuit 610 has a function of controlling an operation of each part of the three-dimensional object printing apparatus 100, and a function of processing various data. For example, the processing circuit 610 includes one or more processors such as a central processing unit (CPU). Note that the processing circuit 610 may include, instead of or in addition to the CPU, a programmable logic device such as a field-programmable gate array (FPGA).

The storage circuit 620 stores various programs such as a program P executed by the processing circuit 610, and various data processed by the processing circuit 610, such as curvature information Da, arrangement information Db, and pass information Dc. The storage circuit 620 includes, for example, one of or both of a volatile semiconductor memory such as a random access memory (RAM), and a non-volatile semiconductor memory such as an electrically erasable programmable read only memory (EEPROM) or a programmable ROM (PROM). Note that the storage circuit 620 may be configured as a part of the processing circuit 610.

The curvature information Da is information regarding the curvature of the curved surface WF of work W. The curvature information Da is information indicating the three-dimensional shape of the workpiece W, or information obtained by measurement of the displacement sensor 330 described above. The arrangement information Db is information regarding the number of a plurality of nozzles N of the liquid ejecting head 310, and arrangement such as a pitch or an arrangement direction. The pass information Dc is information regarding a pass, such as the number of passes, a pass width, and a pass position in a printing operation for the workpiece W.

The power supply circuit 630 receives power from a commercial power supply (not illustrated) and generates various predetermined potentials. Various generated potentials are appropriately supplied to each part of the three-dimensional object printing apparatus 100. For example, the power supply circuit 630 generates a power supply potential VHV and an offset potential VBS. The offset potential VBS is supplied to the liquid ejecting head unit 300. Further, the power supply potential VHV is supplied to the driving signal generation circuit 640.

The driving signal generation circuit 640 is a circuit that generates a driving signal Com for driving each piezoelectric element 311 of the liquid ejecting head 310. Specifically, the driving signal generation circuit 640 includes, for example, a DA conversion circuit and an amplifying circuit. In the driving signal generation circuit 640, a waveform specifying signal dCom to be described later from the processing circuit 610 is converted from a digital signal to an analog signal, and the amplifying circuit amplifies the analog signal by using the power supply potential VHV from the power supply circuit 630, thereby generating the driving signal Com. Here, a signal having a waveform actually supplied to the piezoelectric element 311 among waveforms included in the driving signal Com is a driving pulse PD. The driving pulse PD is supplied from the driving signal generation circuit 640 to the piezoelectric element 311 through the driving circuit 340 for driving the piezoelectric element 311. The driving circuit 340 switches whether or not to supply, as the driving pulse PD, at least some of the waveforms included in the driving signal Com based on a control signal SI to be described later.

In the above-described control device 600, the processing circuit 610 executes a program P stored in the storage circuit 620 to control an operation of each part of the three-dimensional object printing apparatus 100. Specifically, the processing circuit 610 executes the program P to function as an information acquisition unit 611, the arm control unit 612, an ejection control unit 613, and a pass determination unit 614.

The information acquisition unit 611 acquires various information necessary for the driving of the robot 200 and the liquid ejecting head unit 300. Specifically, the information acquisition unit 611 acquires printing data Img from the external device 700, information D1 from the encoder included in the arm driving mechanism 230, and information D2 from the displacement sensor 330. Further, the information acquisition unit 611 appropriately reads and acquires information such as the curvature information Da, the arrangement information Db, and the pass information Dc stored in the storage circuit 620, and appropriately stores various information after the acquisition in the storage circuit 620.

The arm control unit 612 controls the driving of the robot 200 based on the information from the information acquisition unit 611. Specifically, the arm control unit 612 generates a control signal Sk based on the information indicating the three-dimensional shape of the workpiece W, the information D1 from the arm driving mechanism 230, and the pass information Dc. The control signal Sk controls the driving of the motor included in the arm driving mechanism 230 so that the liquid ejecting head 310 is positioned at a desired position and is in a desired posture. The information indicating the three-dimensional shape is included in, for example, the printing data Img, or is obtained by measurement using the displacement sensor 330 or the like. Note that the information indicating the three-dimensional shape may be input from the external device 700 to the control device 600 separately from the printing data Img.

Note that correspondence between the information D1 and the position and posture of the liquid ejecting head is acquired by calibration or the like in advance, and stored in the storage circuit 620. Further, the arm control unit 612 acquires information regarding the actual position and posture of the liquid ejecting head 310 based on the actual information D1 from the arm driving mechanism 230, and the correspondence. Then, a control is performed by using the information regarding the position and posture. Further, the arm control unit 612 may appropriately adjust the control signal Sk so that the distance between the liquid ejecting head 310 and the surface of the workpiece W is maintained in a predetermined range, by using the information D2 from the displacement sensor 330.

The ejection control unit 613 controls the driving of the liquid ejecting head unit 300 based on the information from the information acquisition unit 611. Specifically, the ejection control unit 613 generates the control signal SI and the waveform specifying signal dCom based on the printing data Img and the pass information Dc. The control signal SI is a digital signal for specifying an operation state of the piezoelectric element 311 of the liquid ejecting head 310 to be described later. Here, the control signal SI may include another signal such as a timing signal for specifying a driving timing of the piezoelectric element 311. The timing signal is generated based on the information D1 from the encoder included in the arm driving mechanism 230. The waveform specifying signal dCom is a digital signal for specifying the waveform of the driving signal Com. The printing data Img is information indicating a two-dimensional image or three-dimensional image, and is supplied from the external device 700 such as a PC.

The pass determination unit 614 generates the pass information Dc based on the information from the information acquisition unit 611. Specifically, the pass determination unit 614 generates the pass information Dc based on the curvature information Da and the arrangement information Db. The determination of the pass information Dc will be described later.

1-3. Liquid Ejecting Head Unit

Figure 3:
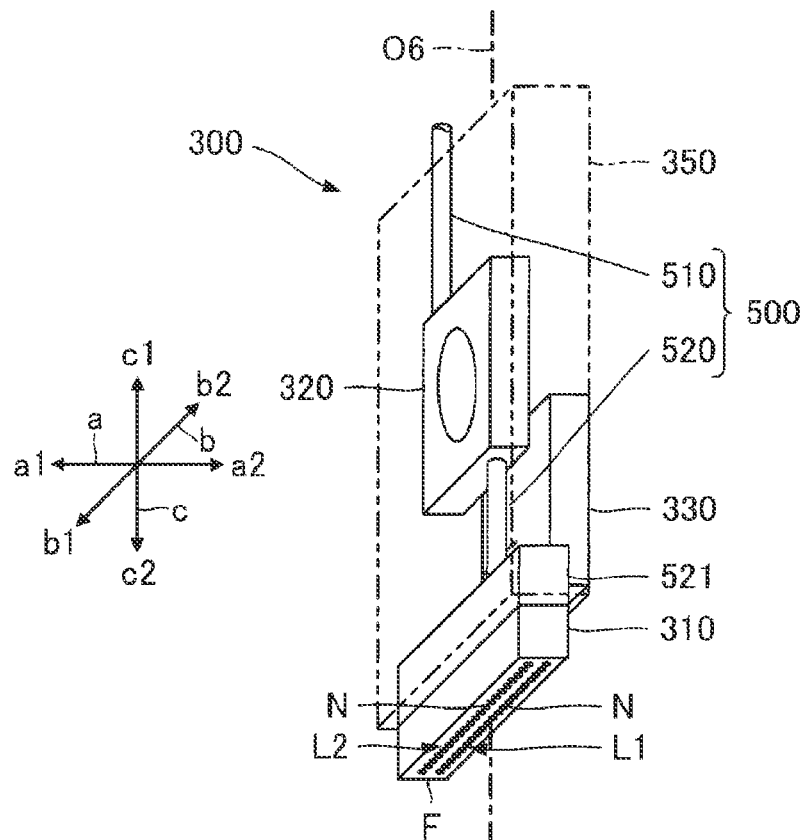
FIG. 3 is a perspective view illustrating a schematic configuration of a liquid ejecting head unit according to an embodiment.

FIG. 3 is a perspective view illustrating a schematic configuration of the liquid ejecting head unit 300 according to an embodiment.

In the following description, an a axis, a b axis, and a c axis that intersect one another are appropriately used. Further, a direction along the a axis is referred to as an a1 direction, and a direction opposite to the a1 direction is referred to as an a2 direction. Similarly, directions opposite to each other along the b axis are referred to as a b1 direction and a b2 direction. Further, directions opposite to each other along the c axis are referred to as a c1 direction and a c2 direction.

Here, the a axis, the b axis, and the c axis are coordinate axes of a tool coordinate system set in the liquid ejecting head unit 300, and their relative positions and postures with respect to the X axis, the Y axis, and the Z axis described above are changed according to the operation of the robot 200 described above. In the example illustrated in FIG. 3, the c axis is parallel to the sixth rotational axis O6. Note that the a axis, the b axis, and the c axis are typically orthogonal to one another. However, the a axis, the b axis, and the c axis are not limited thereto, and it is sufficient that the a axis, the b axis, and the c axis intersect one another within an angle range of 80° to 100°.

The liquid ejecting head unit 300 includes the liquid ejecting head 310, the pressure adjustment valve 320, and the displacement sensor 330 as described above. The liquid ejecting head 310, the pressure adjustment valve 320, and the displacement sensor 330 are supported by a support 350 indicated by a line with alternating long and two short dashes in FIG. 3.

The support 350 is formed of, for example, a metal material, and is a substantially rigid body. Note that, although the support 350 has a flat box shape in FIG. 3, the shape of the support 350 is not particularly limited and may be arbitrary.

The above-described support 350 is mounted on the distal end of the arm 220 described above, that is, the arm 226. Therefore, each of the liquid ejecting head 310, the pressure adjustment valve 320, and the displacement sensor 330 is fixed to the arm 226.

In the example illustrated in FIG. 3, the pressure adjustment valve 320 is positioned in the c1 direction with respect to the liquid ejecting head 310. The displacement sensor 330 is positioned in the a2 direction with respect to the liquid ejecting head 310.

Further, in the example illustrated in FIG. 3, a part of the downstream flow path 520 of the supply flow path 500 is formed using a flow path member 521. The flow path member 521 includes a flow path for distributing the ink from the pressure adjustment valve 320 to a plurality of portions of the liquid ejecting head 310. The flow path member 521 is, for example, a laminate of a plurality of substrates formed of a resin material, and a groove or hole for the flow path of the ink is appropriately provided in each substrate.

The liquid ejecting head 310 has a nozzle surface F and includes a plurality of nozzles N opened in the nozzle surface F. In the example illustrated in FIG. 3, a normal line direction of the nozzle surface F is the c2 direction, and the plurality of nozzles N are divided into a first nozzle row L1 and a second nozzle row L2 that are arranged at an interval in the direction along the a axis. Each of the first nozzle row L1 and the second nozzle row L2 is a set of the plurality of nozzles N linearly arranged in a direction along the b axis. Here, an element related to each nozzle N of the first nozzle row L1 and an element related to each nozzle N of the second nozzle row L2 are approximately symmetrical to each other in the liquid ejecting head 310.

However, the positions of the plurality of nozzles N in the first nozzle row L1 and the plurality of nozzles N in the second nozzle row L2 in the direction along the b axis may be the same as or different from each other. Further, the element related to each nozzle N of one of the first nozzle row L1 and the second nozzle row L2 may be omitted. Hereinafter, a configuration in which the positions of the plurality of nozzles N in the first nozzle row L1 and the plurality of nozzles N in the second nozzle row L2 in the direction along the b axis are the same as each other will be described by way of example.

Figure 4:
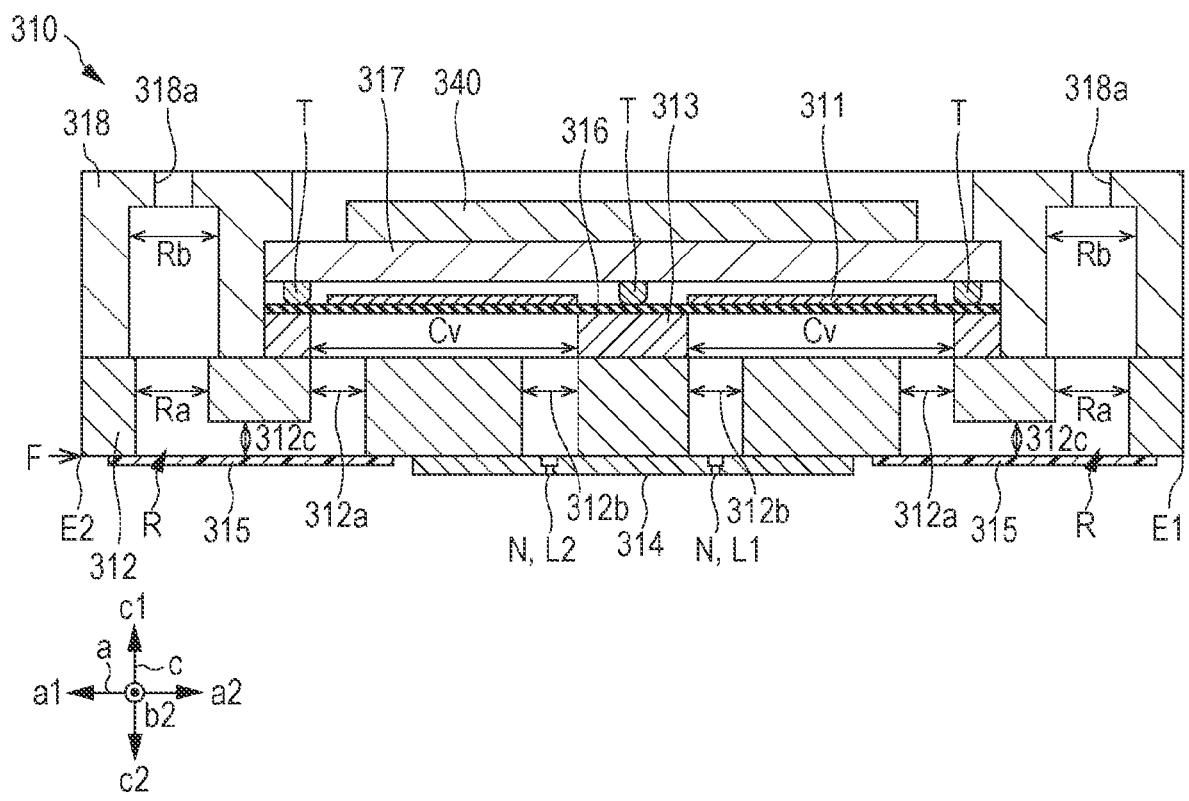
FIG. 4 is a cross-sectional view illustrating a configuration example of a liquid ejecting head according to an embodiment.

FIG. 4 is a cross-sectional view illustrating a configuration example of the liquid ejecting head 310 according to an embodiment. As illustrated in FIG. 4, the liquid ejecting head 310 includes a flow path substrate 312, a pressure chamber substrate 313, a nozzle plate 314, a vibration absorber 315, a vibration plate 316, a plurality of piezoelectric elements 311, a wiring substrate 317, and a case 318.

The flow path substrate 312 and the pressure chamber substrate 313 form a flow path for supplying the ink to the plurality of nozzles N. The flow path substrate 312 and the pressure chamber substrate 313 are stacked in this order in the c1 direction. Each of the flow path substrate 312 and the pressure chamber substrate 313 are plate-shaped members that are elongated in the direction along the b axis. The flow path substrate 312 and the pressure chamber substrate 313 are bonded to each other by using, for example, an adhesive.

In a region that is positioned more toward the c1 direction than the pressure chamber substrate 313 is, the vibration plate 316, the wiring substrate 317, the case 318, and the driving circuit 340 are installed. On the other hand, in a region that is positioned more toward the c2 direction than the flow path substrate 312 is, the nozzle plate 314 and the vibration absorber 315 are installed. These respective elements are plate-shaped members that are substantially elongated in the direction along the b axis, similarly to the flow path substrate 312 and the pressure chamber substrate 313, and are bonded to one another by using, for example, an adhesive.

The nozzle plate 314 is a plate-shaped member in which the plurality of nozzles N are formed. Each of the plurality of nozzles N is a circular through-hole through which the ink passes. The nozzle plate 314 is produced by processing a single crystal silicon substrate by using a semiconductor producing technology that uses a processing technology such as dry etching or wet etching. However, another known method and material may be appropriately used to produce the nozzle plate 314.

Here, the above-described nozzle surface F is a surface that expands along a direction perpendicular to the c axis from an opening of one end of the nozzle N in the c2 direction among surfaces forming the appearance of the liquid ejecting head 310. In the example illustrated in FIG. 4, the surface of the liquid ejecting head 310 that faces the c2 direction is the nozzle surface F, and the nozzle surface F has a surface of the nozzle plate 314 that faces the c2 direction. Further, an end of the nozzle surface F in the a2 direction, that is, a portion of the nozzle surface F that is positioned most toward the a2 direction, is a first end E1, and an end of the nozzle surface F in the a1 direction, that is, a portion of the nozzle surface F that is positioned most toward the a1 direction, is a second end E2. In the present embodiment, each of the first end E1 and the second end E2 is a side along the b axis. The first nozzle row L1 and the second nozzle row L2 described above are provided between the first end E1 and the second end E2 of the nozzle surface F.

In the flow path substrate 312, a space Ra, a plurality of supply flow paths 312a, a plurality of communicating flow paths 312b, and a supply liquid chamber 312c are provided for each of the first nozzle row L1 and the second nozzle row L2. The space Ra is an elongated opening extending in the direction along the b axis in plan view when viewed from a direction along the c axis. Each of the supply flow path 312a and the communicating flow path 312b is a through-hole formed for each nozzle N. The supply liquid chamber 312c is an elongated space that extends over the plurality of nozzles N in the direction along the b axis, and makes the space Ra and the plurality of supply flow paths 312a be in communication with each other. Each of the plurality of communicating flow paths 312b overlaps one nozzle N corresponding to the corresponding communicating flow path 312b in plan view.

The pressure chamber substrate 313 is a plate-shaped member in which a plurality of pressure chambers Cv, which are called cavities, are formed for each of the first nozzle row L1 and the second nozzle row L2. The plurality of pressure chambers Cv are arranged in the direction along the b axis. Each pressure chamber Cv is formed for each nozzle N, and is an elongated space extending in the direction along the a axis in plan view. Each of the flow path substrate 312 and the pressure chamber substrate 313 is produced by processing a single crystal silicon substrate by using, for example, a semiconductor producing technology, similarly to the nozzle plate 314 described above. However, another known method and material may be appropriately used to produce each of the flow path substrate 312 and the pressure chamber substrate 313.

The pressure chamber Cv is a space positioned between the flow path substrate 312 and the vibration plate 316. The plurality of pressure chambers Cv are arranged in the direction along the b axis for each of the first nozzle row L1 and the second nozzle row L2. Further, the pressure chamber Cv is in communication with each of the communication flow path 312b and the supply flow path 312a. Therefore, the pressure chamber Cv is in communication with the nozzle N through the communicating flow path 312b and is in communication with the space Ra through the supply flow path 312a and the supply liquid chamber 312c.

The vibration plate 316 is arranged on a surface of the pressure chamber substrate 313 that faces the c2 direction. The vibration plate 316 is a plate-shaped member that can elastically vibrate. The vibration plate 316 includes, for example, an elastic film formed of silicon oxide ($SiO_2$) and an insulating film formed of zirconium oxide ($ZrO_2$), and these films are stacked. The elastic film is formed by, for example, performing thermal oxidation on one surface of a single crystal silicon substrate. The insulating film is formed by, for example, forming a zirconium layer by using a sputtering method, and performing thermal oxidation on the layer.

The plurality of piezoelectric elements 311 corresponding to the respective nozzles N are arranged on a surface of the vibration plate 316 that faces the c1 direction for each of the first nozzle row L1 and the second nozzle row L2. Each piezoelectric element 311 is a passive element that is deformed according to the supply of the driving pulse PD described above. Each piezoelectric element 311 has an elongated shape extending in the direction along the a axis in plan view. The plurality of piezoelectric elements 311 are arranged in the direction along the b axis so as to correspond to the plurality of pressure chambers Cv. When the vibration plate 316 vibrates due to the deformation of the piezoelectric element 311, the pressure in the pressure chamber Cv is changed, such that the ink is ejected from the nozzle N. At this time, the ink is ideally ejected in the c2 direction. However, in actual implementation, the ink may be ejected in a direction different from the c2 direction due to errors caused by an inertia force generated when the liquid ejecting head unit 300 moves, the influence of the flow of an outside air, or the like. Note that, in the following description, such errors are not considered, and the ideal state where the ink is ejected in the c2 direction is assumed.

The case 318 is a case for storing the ink to be supplied to the plurality of pressure chambers Cv. As illustrated in FIG. 4, a space Rb is formed in the case 318 of the present embodiment for each of the first nozzle row L1 and the second nozzle row L2. The space Rb of the case 318 and the space Ra of the flow path substrate 312 are in communication with each other. A space formed with the space Ra and the space Rb functions as a liquid storing chamber (reservoir) R in which the ink to be supplied to the plurality of pressure chambers Cv is stored. The ink is supplied to the liquid storing chamber R through an inlet 318a formed in the case 318. The ink in the liquid storing chamber R is supplied to the pressure chamber Cv through the supply liquid chamber 312c and each supply flow path 312a. The vibration absorber 315 is a flexible film (compliance substrate) forming a wall surface of the liquid storing chamber R, and absorbs variation in pressure of the ink in the liquid storing chamber R.

The wiring substrate 317 is a plate-shaped member in which wirings for electrically coupling the driving circuit 340 and the plurality of piezoelectric elements 311 to each other are formed. A surface of the wiring substrate 317 that faces the c2 direction is bonded to the vibration plate 316 through a plurality of conductive bumps T. Meanwhile, the driving circuit 340 is mounted on a surface of the wiring substrate 317 that faces the c1 direction.

The driving circuit 340 is an integrated circuit (IC) chip that outputs a driving signal for driving each piezoelectric element 311 and a reference voltage. Specifically, the driving circuit 340 switches whether or not to supply, as the driving pulse PD, the driving signal Com for each of the plurality of piezoelectric elements 311 based on the control signal SI described above.

Although not illustrated, the surface of the wiring substrate 317 that faces the c1 direction is bonded to an end portion of an external wiring electrically coupled to the control device 600. The external wiring includes, for example, a coupling component such as a flexible printed circuit (FPC) or a flexible flat cable (FFC). Note that the wiring substrate 317 may be an FPC, an FFC, or the like.

As described above, the three-dimensional object printing apparatus 100 includes the liquid ejecting head 310, and the robot 200 which is an example of the "moving mechanism". As described above, the liquid ejecting head 310 ejects the ink, which is an example of the "liquid", toward the three-dimensional work W having the curved surface WF. The robot 200 changes the relative position and posture of the liquid ejecting head unit 310 with respect to the workpiece W.

Figure 5:
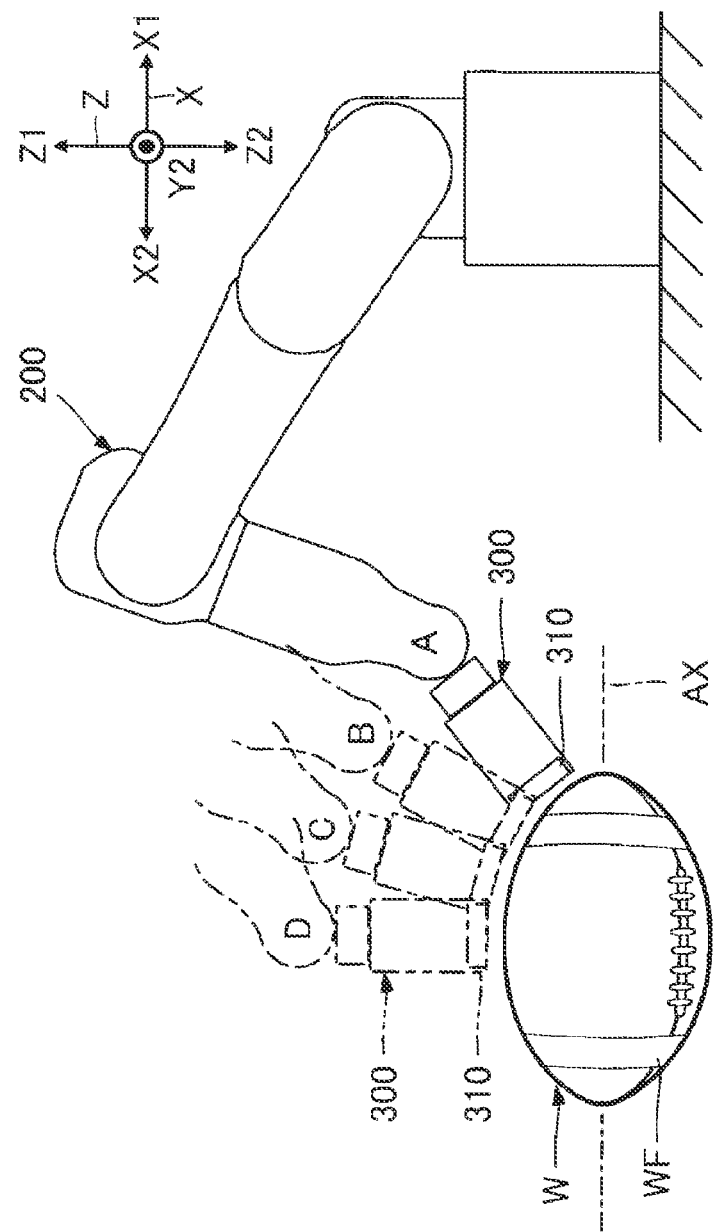
FIG. 5 is a diagram for describing a printing operation according to an embodiment.

1-4. Operation of Three-Dimensional Object Printing Apparatus and Three-Dimensional Object Printing Method FIG. 5 is a diagram for describing a printing operation according to an embodiment. FIG. 5 illustrates a case in which an image is formed on the curved surface WF of the workpiece W by four passes A, B, C, and D. The pass A is an example of a "first pass". The pass B is an example of a "second pass". The pass C is an example of a "third pass". The pass D is an example of a "fourth pass". Here, the "pass" is a series of operations in which the liquid ejecting head 310 eject the ink on the curved surface WF of the workpiece W while the robot 200 is driven in a state where the nozzle surface F of the liquid ejecting head 310 faces the curved surface WF and scanning along the curved surface WF. Note that when a plurality of passes are consecutively performed, the liquid ejecting head 310 does not eject the ink after any one pass is performed and until the next pass starts.

In the present embodiment, a case in which the image is formed by four passes A, B, C, and D is described. However, any one of the pass B and the pass C may double as the other one as in a modified example to be described later. Further, an image to be printed may be formed by five or more passes, and in this case, an arbitrary number of passes may be performed between the pass B and the pass C. In addition, each of printing performed by the passes A and B, and printing performed by the passes C and D may be individual printing, and in this case, a temporal relationship between the printings may be arbitrary.

In each pass, the robot 200 may move the liquid ejecting head 310 along an arc around the major axis AX so that the distance between the liquid ejecting head 310 and the curved surface WF is maintained in a predetermined range. However, when the image to be printed is small or the like, the robot 200 may linearly move the liquid ejecting head 310 along a direction intersecting the major axis AX, for example, the Y1 direction or the Y2 direction. Note that, in the example illustrated in FIG. 5, the major axis AX is parallel to the X axis.

The pass A, the pass B, the pass C, and the pass D are arranged in this order in the X2 direction, and positions thereof in a direction along the major axis AX are different from each other. As these passes are performed, images formed by the respective passes are arranged to form the image to be printed. Here, the pass A, the pass B, and the pass C, and the pass D may be performed in any order. The pass A, the pass B, and the pass C, and the pass D may be performed in this order or in reverse order in order to increase a printing speed. Note that a step of performing the pass A is an example of a "first step". A step of performing the pass B is an example of a "second step". A step of performing the pass C is an example of a "third step". A step of performing the pass D is an example of a "fourth step".

Here, printing regions of two adjacent passes among the passes A, B, C, and D partially overlap each other. Further, a width of the printing region of each of these passes is determined according to the curvature of the curved surface WF in the printing region. Here, the printing region of each pass will be described below.

Figure 6:
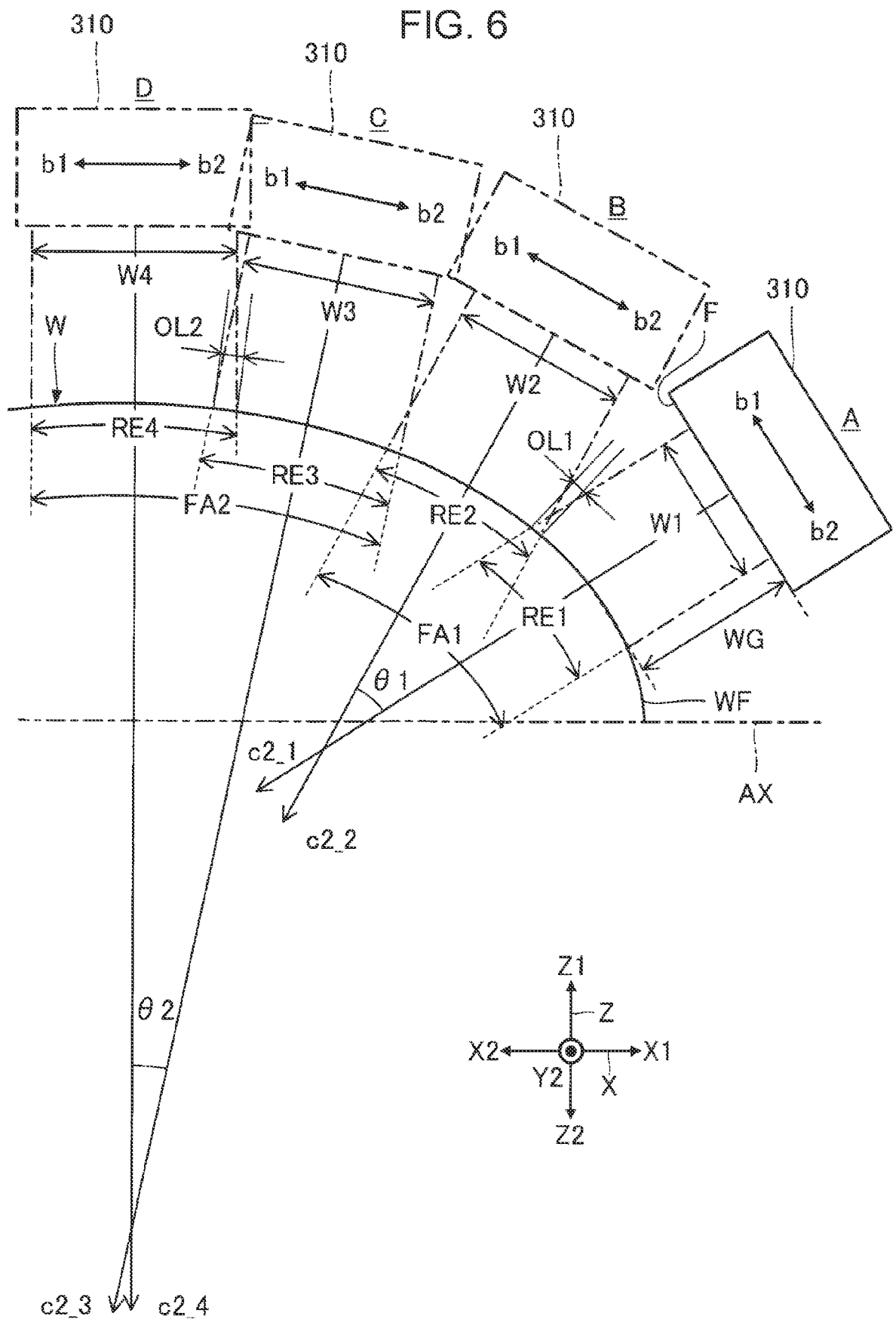
FIG. 6 is a diagram for describing a width of each region that is a printing target and an overlapping width between regions according to an embodiment.

FIG. 6 is a diagram for describing a width of each region that is a printing target and an overlapping width between regions according to an embodiment. FIG. 6 illustrates, as regions set in the curved surface WF of the workpiece W, a region RE1 which is a printing region of the pass A, a region RE2 which is a printing region of the pass B, a region RE3 which is a printing region of the pass C, and a region RE4 which is a printing region of the pass D. Note that the region RE1 is an example of a "first region". The region RE2 is an example of a "second region". The region RE3 is an example of a "third region". The region RE4 is an example of a "fourth region". Note that, although the region RE2 and the region RE3 partially overlap each other in the example illustrated in FIG. 6, a region which is not a printing target may be interposed between these regions. In the present embodiment, a detailed description is omitted, but the overlapping width between the region RE2 and the region RE3 is determined according to the curvature of the curved surface WF, similarly to the overlapping width between other regions.

The liquid ejecting head 310 is scanned from the front side to the back side of the paper surface of FIG. 6. Alternatively, the liquid ejecting head 310 is scanned from the back side to the front side of the paper surface of FIG. 6. In each pass, the posture of the liquid ejecting head 310 is controlled so that the nozzle surface F is parallel to a tangent plane at an intersection point between a segment extending from the center of the nozzle surface F in the c2 direction and the curved surface WF. Further, the b axis, which is the direction in which the first nozzle row L1 and the second nozzle row L2 described above extend, intersects a scanning direction of the liquid ejecting head 310 in each pass. Note that the region RE1 and the region RE2 are arranged so as to partially overlap each other in a direction orthogonal to the scanning direction of the liquid ejecting head 310 in the pass A or B. Further, the region RE3 and the region RE4 are arranged so as to partially overlap each other in a direction orthogonal to the scanning direction of the liquid ejecting head 310 in the pass C or D.

As illustrated in FIG. 6, the positions of the regions RE1, RE2, RE3, and RE4 in the direction along the major axis AX are different from each other. Here, the regions RE1, RE2, RE3, and RE4 are arranged in this order in the X2 direction according to the order of the pass A, the pass B, the pass C, and the pass D described above. Among these regions, the region RE1 is closest to the major axis AX, and the region RE4 is most distant from the major axis AX.

Among the regions RE1, RE2, RE3, and RE4, two adjacent regions partially overlap each other. Here, the curvature of a surface FA1 which is a region to be subjected to printing by the passes A and B is larger than the curvature of a surface FA2 which is a region to be subjected to printing by the passes C and D. Therefore, in the surface FA1 having a relatively large curvature, a printing error at seams of the regions RE1 and the regions RE2 overlapping each other is rarely conspicuous due to visual and shape factors, and in the surface FA2 having a relatively small curvature, a printing error at seams of the regions RE3 and the regions RE4 overlapping each other becomes conspicuous due to visual and shape factors. Note that the "curvature" is the curvature of an arc when a target surface is approximated by the arc. Describing the visual and shape factors in detail, in general, a surface having a large curvature is often provided at the end portion of the workpiece W, and since the workpiece W is a three-dimensional object, a shadow region is easily generated in some observation directions, and as a result, it is difficult for an observer to recognize a printing error, and the printing error becomes inconspicuous. Meanwhile, in general, a surface having a small curvature is often provided at the center of the workpiece W, a shadow region is hardly generated regardless of the observation direction, and as a result, an observer easily recognizes a printing error, and the printing error becomes conspicuous.

Therefore, in the three-dimensional object printing apparatus 100, an overlapping width OL2 between the region RE3 and the region RE4 in the surface FA2 having a relatively small curvature is larger than an overlapping width OL1 between the region RE1 and the region RE2 in the surface FA1 having a relatively large curvature. Therefore, in the surface FA2 in which a printing error becomes conspicuous due to the visual and shape factors as described above, an area by which errors can be complemented by the pass C and the pass D is increased, such that it is possible to make the printing error inconspicuous. Meanwhile, the overlapping width OL1 between the region RE1 and the region RE2 in the surface FA1 having a relatively large curvature is smaller than the overlapping width OL2 between the region RE3 and the region RE4 in the surface FA2 having a relatively small curvature. Therefore, in the surface FA1 in which a printing error is inconspicuous due to the visual and shape factors as described above, an area by which errors can be complemented by the pass A and the pass B can be decreased, such that it is possible to improve the printing speed. By combining the above-described configurations, it is possible to improve the printing speed without making the printing error conspicuous.

Here, each of the regions RE1, RE2, RE3, and RE4 is a maximum region that allows the application of the ink from the liquid ejecting head 310 in a corresponding pass. Note that the width of each of the regions RE1, RE2, RE3, and RE4 corresponds to the width of a nozzle N whose use is allowed among the plurality of nozzles N of the liquid ejecting head 310 in the corresponding pass. The nozzle N whose use is allowed is determined according to the curvature of the corresponding region. That is, the plurality of nozzles N of the liquid ejecting head 310 are divided into a plurality of nozzles N whose use is allowed, and a plurality of nozzles N whose use is restricted depending on the curvature of a region to be subjected to printing.

In the example illustrated in FIG. 6, among the curvatures of the regions RE1, RE2, RE3, and RE4, the curvature of the region RE1 is largest, sequentially followed by the region RE2, the region RE3, and the region RE4. Accordingly, among the widths of the regions RE1, RE2, RE3, and RE4, the width W1 of the region RE1 is smallest, sequentially followed by the region RE2, the region RE3, and the region RE4. As such, the larger the curvature, the smaller the width of the regions. Therefore, it is possible to reduce variation in distance WG between the nozzle N and the curved surface WF. Hereinafter, the determination of the width of each of the regions RE1, RE2, RE3, and RE4 will be described.

Figure 7:
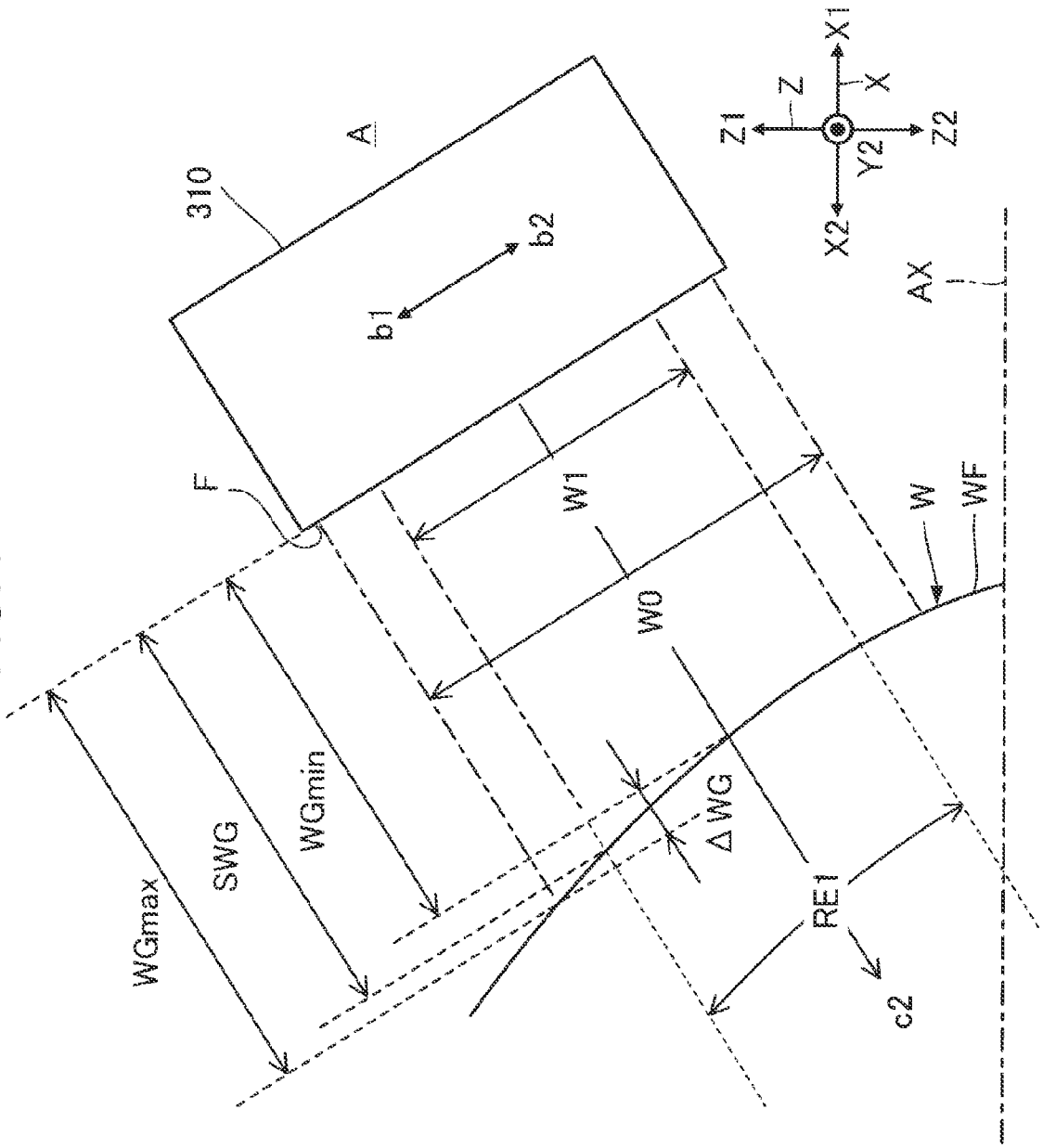
FIG. 7 is a diagram for describing a method of determining a width of each region according to an embodiment.

FIG. 7 is a diagram for describing a method of determining the width of each region according to an embodiment. FIG. 7 illustrates a relationship between the width W1 of the region RE1 in the pass A and a maximum printing width W0. The maximum printing width W0 is the width of a region that can be subjected to printing when using all nozzles N of the liquid ejecting head 310. When using all nozzles N of the liquid ejecting head 310, the larger the curvature of the curved surface WF, the larger the difference ΔWG between a maximum value WGmax and a minimum value WGmin of the distance WG between the nozzle N and the workpiece W. Therefore, the larger the curvature of the curved surface WF, the larger the impact error between the nozzles N.

Here, the three-dimensional object printing apparatus 100 calculates the distance WG between each of the plurality of nozzles N of the liquid ejecting head 310 and the workpiece W, and uses a nozzle N whose distance WG is equal to or smaller than a threshold value SWG among the plurality of nozzles N. Therefore, the distance WG between the nozzle N and the workpiece W used in each pass is equal to or smaller than the threshold value SWG. Here, the threshold value SWG is appropriately set between the maximum value WGmax and the minimum value WGmin. As the width of each region and the overlapping width between the regions are determined as described above, it is possible to obtain the pass information Dc. Hereinafter, a three-dimensional object printing flow including the generation of the pass information Dc will be described.

Figure 8:
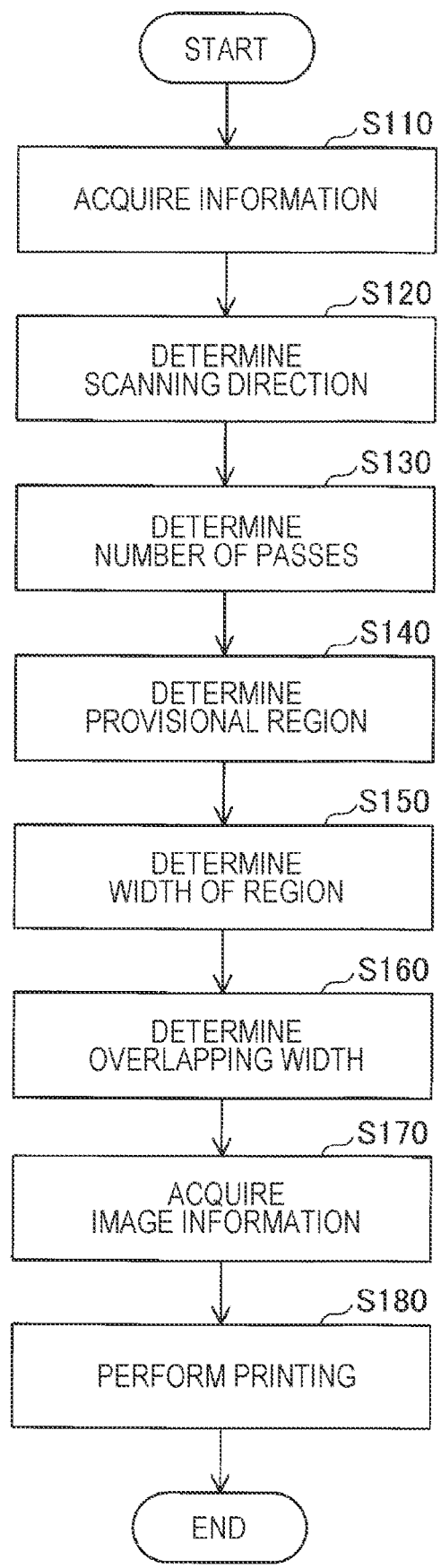
FIG. 8 is a flowchart for describing a three-dimensional object printing method according to an embodiment.

FIG. 8 is a flowchart for describing the three-dimensional object printing method according to an embodiment. As illustrated in FIG. 8, first, in Step S110, the curvature information Da and the arrangement information Db are acquired. The acquisition is performed by the information acquisition unit 611. Specifically, in Step S110, the information acquisition unit 611 reads, from the storage circuit 620, the curvature information Da and the arrangement information Db.

Next, in Step S120, the scanning direction is determined. The determination may be automatically performed by the pass determination unit 614, or may be manually performed by an input from a user. When the determination is automatically performed by the pass determination unit 614, the determination is made based on, for example, the shape and arrangement of the workpiece W. Note that the scanning direction may be preset in the pass determination unit 614 regardless of the shape of the workpiece W or the like, and in this case, Step S120 may be omitted.

Next, in Step S130, the number of passes is determined. The determination is performed by the pass determination unit 614. Specifically, in Step S130, the pass determination unit 614 determines the number of passes necessary for performing printing on the region of the workpiece W to be subjected to printing based on the curvature information Da and the arrangement information Db. For example, the larger the length of the workpiece W in a direction orthogonal to the scanning direction, the larger the number of passes.

Next, in Step S140, a provisional region is determined. The determination is performed by the pass determination unit 614. Specifically, in Step S140, the pass determination unit 614 determines a plurality of provisional regions of which the number corresponds to the number of passes based on the number of passes determined in Step S130 described above. The provisional region refers to each of the temporary regions RE1, RE2, RE3, and RE4 in the present embodiment. Here, the width of each provisional region is the maximum printable width of the liquid ejecting head 310.

Next, in Step S150, the width of the region is determined. The determination is performed by the pass determination unit 614. Specifically, in Step S150, the pass determination unit 614 adjusts the width of each provisional region according to the method of determining the width of the region described above based on the curvature in each provisional region determined in Step S140 described above. As a result, the width of each of the regions RE1, RE2, RE3, and RE4 is determined.

Next, in Step S160, the overlapping width between the regions is determined. The determination is performed by the pass determination unit 614. Specifically, in Step S160, the pass determination unit 614 determines the overlapping width between two provisional regions according to the method of determining the overlapping width described above based on the curvature of a surface including two adjacent provisional regions among the plurality of provisional regions whose widths are adjusted in Step S150 described above. According to the determination result, the position of each provisional region in the direction along the major axis AX is adjusted. As a result, the overlapping widths between the regions RE1, RE2, RE3, and RE4 are determined.

Next, in Step S170, image information is acquired. The acquisition is performed by the information acquisition unit 611. Specifically, in Step S170, the information acquisition unit 611 reads, from the external device 700 or the storage circuit 620, the printing data Img. Note that Step S170 may be performed before Step S160 described above. For example, Step S110 described above may double as Step S170, and in this case, in Step S120 or Step S130, the determination of the scanning direction or the determination of the number of passes according to the printing data Img is performed.

Next, in Step S180, printing is performed. The printing is performed by the arm control unit 612 and the ejecting control unit 613 as described above.

As described above, the printing operation for the workpiece W includes the first step of performing the pass A which is an example of the "first pass", the second step of performing the pass B which is an example of the "second pass", the third step of performing the pass C which is an example of the "third pass", and the fourth step of performing the pass D which is an example of the "fourth pass".

As described above, in the pass A, the robot 200 moves the liquid ejecting head 310 relative to the region RE1 which is an example of the "first region" of the workpiece W, and the liquid ejecting head 310 ejects the ink. In the pass B, the robot 200 moves the liquid ejecting head 310 relative to the region RE2 which is an example of the "second region" that partially overlaps the region RE2 of the workpiece W, and the liquid ejecting head 310 ejects the ink. In the pass C, the robot 200 moves the liquid ejecting head 310 relative to the region RE3 which is an example of the "third region" of the workpiece W, and the liquid ejecting head 310 ejects the ink. In the pass D, the robot 200 moves the liquid ejecting head 310 relative to the region RE4 which is an example of the "fourth region" that partially overlaps the region RE3 of the workpiece W, and the liquid ejecting head 310 ejects the ink.

The curvature of the surface FA1 including the regions RE1 and the regions RE2 is larger than the curvature of the surface FA2 including the region RE3 and the region RE4. Note that, as long as the curvature of the surface FA1 is larger than the curvature of the surface FA2, the curvature of the region RE1 may be equal to the curvature of the region RE2, or may be larger or smaller than the curvature of the region RE2. Similarly, the curvature of the region RE3 may be equal to the curvature of the region RE4, or may be larger or smaller than the curvature of the region RE4. In addition, one of the region RE1 and the region RE2 may be a flat surface. Similarly, one of the region RE3 and the region RE4 may be a flat surface. Further, each region is not limited to a convexly curved surface, and may be a concavely curved surface.

As described above, the overlapping width OL1 between the region RE1 and the region RE2 is smaller than the overlapping width OL2 between the region RE3 and the region RE4. Therefore, it is possible to improve the printing speed without making the printing error at seams formed by each overlapping conspicuous.

Specifically, the curvature of the surface FA1 including the regions RE1 and the regions RE2 is larger than the curvature of the surface FA2 including the region RE3 and the region RE4. Therefore, even when the overlapping width OL1 between the region RE1 and the region RE2 is small, the printing error at seams of the regions RE1 and the regions RE2 overlapping each other is rarely conspicuous due to the visual and shape factors.

Meanwhile, the curvature of the surface FA2 including the regions RE3 and the regions RE4 is smaller than the curvature of the surface FA1 including the region RE1 and the region RE2. Therefore, when the overlapping width OL2 between the region RE3 and the region RE4 is small, the printing error at seams of the regions RE3 and the regions RE4 overlapping each other becomes conspicuous due to the visual and shape factors.

Here, when the overlapping width between two adjacent regions is small, the printing error at seams formed by the two adjacent regions overlapping each other becomes conspicuous, but a printing time is decreased. On the other hand, when the overlapping width between two adjacent regions is large, the printing error at seams formed by the two adjacent regions overlapping each other is rarely conspicuous, but the printing time is increased.

As described above, the overlapping width OL1 between the region RE1 and the region RE2 is smaller than the overlapping width OL2 between the region RE3 and the region RE4, such that it is possible to improve both of the image quality and the printing speed.

The c2 direction that is a direction in which the ink from the liquid ejecting head 310 is ejected in the first step as described above is a direction $c2\_1$. The c2 direction that is a direction in which the ink from the liquid ejecting head 310 is ejected in the second step is a direction $c2\_2$. The c2 direction that is a direction in which the ink from the liquid ejecting head 310 is ejected in the third step is a direction $c2\_3$. The c2 direction that is a direction in which the ink from the liquid ejecting head 310 is ejected in the fourth step is a direction $c2\_4$.

Since the curvature of the surface FA1 is larger than the curvature of the surface FA2 as described above, an angle $\theta1$, which is formed by the direction $c2\_1$ which is the ink ejecting direction in the pass A, and the direction $c2\_2$ which is the ink ejecting direction in the pass B, is larger than an angle $\theta2$, which is formed by the direction $c2\_3$ which is the ink ejecting direction in the pass C, and the direction $c2\_4$ which is the ink ejecting direction in the pass D. That is, the angle $\theta1$ indicating an angle change of the direction c2 between the pass A and the pass B is larger than the angle θ2 indicating an angle change of the direction c2 between the pass C and the pass D. Note that such a relationship between the angle θ1 and the angle θ2 is a relationship at the same position in the scanning direction of the liquid ejecting head 310 in each pass. In other words, such a relationship between the angle θ1 and the angle θ2 is a relationship when viewed from a cross section orthogonal to the scanning direction of the liquid ejecting head 310. In the present embodiment, the cross section is, for example, a plane having the major axis AX.

Since the angle θ1 is larger than the angle θ2, the impact error of the ink due to the difference in ink ejecting direction easily occurs at the seams of the region RE1 and the region RE2 overlapping each other, whereas the impact error of the ink due to the difference in ink ejecting direction rarely occurs at the seams of the region RE3 and the region RE4 overlapping each other. The influence of the printing error caused by the difference in ejecting direction is larger than that of the printing error caused by displacement in movement between the passes.

Here, in a state where the impact error due to a difference in ejecting direction easily occurs, when the overlapping width between the passes is large, a range in which the printing error occurs is expanded, and as a result, a bold line appears in the image. On the other hand, in a state where the impact error due to a difference in ejecting direction rarely occurs, even when the overlapping width between the passes is large, the printing error is inconspicuous, and thus, it is possible to suppress a line from appearing. In addition, it is possible to reduce the printing error caused by displacement in movement between the passes (for example, movement of the liquid ejecting head 310 from the position of the liquid ejecting head 310 in the pass C to the position of the liquid ejecting head 310 in the pass D) by making the overlapping width between the passes large. That is, in the present embodiment, the deterioration in image quality caused by the difference in ejecting direction whose influence is large is suppressed by making the overlapping width OL1 small at the seams of the region RE1 and the region RE2, and the deterioration in image quality caused by the displacement in movement between the passes is suppressed by making the overlapping width OL2 large at the seams of the region RE3 and the region RE4, because the deterioration in image quality caused by the difference in ejecting direction rarely occurs.

Note that the liquid ejecting head 310 includes the plurality of nozzles N constituting the nozzle rows as described above. The difference between the minimum value WGmin and the maximum value WGmax of the distance WG between each of the plurality of nozzles N and the workpiece W in the c2 direction which is the ink ejecting direction is the difference ΔWG. Here, since the curvature of the surface FA1 is larger than the curvature of the surface FA2 as described above, the difference ΔWG in the first step and the second step is larger than the difference ΔWG in the third step and the fourth step.

As described above, the order in which the pass A, the pass B, the pass C, and the pass D are performed is not particularly limited, but the pass A and the pass B may be consecutively performed. In this case, it is possible to make the printing time for the region RE1 and the region RE2 shorter than that when performing another pass between the pass A and the pass B. Note that "two consecutive passes" means that no pass is interposed between the two passes, and another pass is performed immediately after any one of the two passes.

From the same point of view, the pass C and the pass D may be consecutively performed. In this case, it is possible to make the printing time for the region RE3 and the region RE4 shorter than when performing another pass between the pass C and the pass D.

In addition, the pass A, the pass B, the pass C, and the pass D may be performed in this order. When the region RE1, the region RE2, the region RE3, and the region RE4 are arranged in this order as in the present embodiment, the pass A, the pass B, the pass C, and the pass D are performed in this order, such that it is possible to decrease the printing time for these regions as compared with the case in which the respective passes are performed in another order.

Further, the total width of the width W1 of the region RE1 and the width W2 of the region RE2 is smaller than the total width of the width W3 of the region RE3 and the width W4 of the region RE4. In other words, the total number of used nozzles of the liquid ejecting head 310 at the time of performing printing on the surface FA1 is smaller than the total number of used nozzles of the liquid ejecting head 310 at the time of performing printing on the surface FA2. With such a total width relationship, it is possible to reduce variation in distance WG between the nozzle N and the workpiece W in each pass. As a result, it is possible to improve the image quality.

Further, W1<W2≤W3<W4, in which the width of the region RE1 is W1, the width of the region RE2 is W2, the width of the region RE3 is W3, and the width of the region RE4 is W4. When the region RE1, the region RE2, the region RE3, and the region RE4 are arranged in a descending order of curvature as in the present embodiment, it is possible to reduce variation in distance WG between the nozzle N and the workpiece W in each step.

As described above, the robot 200 is an articulated robot on which the liquid ejecting head unit 300 which is an example of the "end effector" including the liquid ejecting head 310 is mounted. Therefore, it is possible to use, as the robot 200, an existing articulated robot. Further, since it is possible to more easily grasp the position and posture relationship between the workpiece W and the liquid ejecting head 310, the printing may be appropriately performed on the three-dimensional work W having a curved surface.

As described above, the liquid ejecting head 310 includes the plurality of nozzles N constituting the first nozzle row L1 and the second nozzle row L2 which are examples of the "nozzle row". Among the plurality of nozzles, a nozzle N that satisfies a relation of WG≤SWG ejects the ink, and a nozzle N that satisfies a relation of WG>SWG does not eject the ink, in which the distance between each of the plurality of nozzles N and the workpiece W in the c2 direction which is the ink ejecting direction is WG, and the threshold value is SWG. As described above, it is possible to reduce variation in distance WG between the nozzle N used in each step and the workpiece W by setting a nozzle N used to eject the ink among the plurality of nozzles N of the liquid ejecting head 310. As a result, it is possible to improve the image quality.

Accordingly, the width of at least one of the region RE1, the region RE2, the region RE3, or the region RE4 may be determined based on the distance WG between each of the plurality of nozzles N and the workpiece W in the c2 direction which is the ink ejecting direction and the threshold value SWG.

As described above, the three-dimensional object printing apparatus 100 calculates the distance WG between each of the plurality of nozzles N and the workpiece W in the c2 direction which is the ink ejecting direction based on the curvature information Da regarding the curvature of the curved surface WF of the workpiece W, and the arrangement information Db regarding the arrangement of the plurality of nozzles N. In this case, the width of each region can be determined with simpler computation as compared with a case of determining the width of each region based on a result of computing the curvature for each portion of the workpiece W, which is advantageous.

Here, the curvature information Da may be information indicating the three-dimensional shape of the workpiece W, or information obtained by measurement of the displacement sensor 330 which is a sensor that measures the distance WG between the liquid ejecting head 310 and the workpiece W.

When the information indicating the three-dimensional shape of the workpiece W is used as the curvature information Da, separate hardware such as a sensor is not required, and thus it is possible to simplify the configuration of the apparatus. Further, when the information obtained by measurement of the displacement sensor 330 is used as the curvature information Da, computation for determining the width of each region is simpler as compared with a case of using the information indicating the three-dimensional shape of the workpiece W as the curvature information Da. Further, in this case, since the width of each region is determined based on the three-dimensional shape of the real work W, it is easy to cope with the variation in shape caused by a production error of the workpiece W or the like. Note that the above-described two information may be used as the curvature information Da.

2. Modified Examples

Each embodiment can be modified in the above-described example. Specific modified aspects that can be applied to each embodiment described above are described below by way of example. Note that two or more aspects arbitrarily selected from the following examples can be appropriately and compatibly combined.

2-1. Modified Example 1

In the above-described embodiment, a case in which an image is formed by four passes has been described by way of example. However, is sufficient that the number of passes is three or more. Hereinafter, a case in which the number of passes is three will be described.

Figure 9:
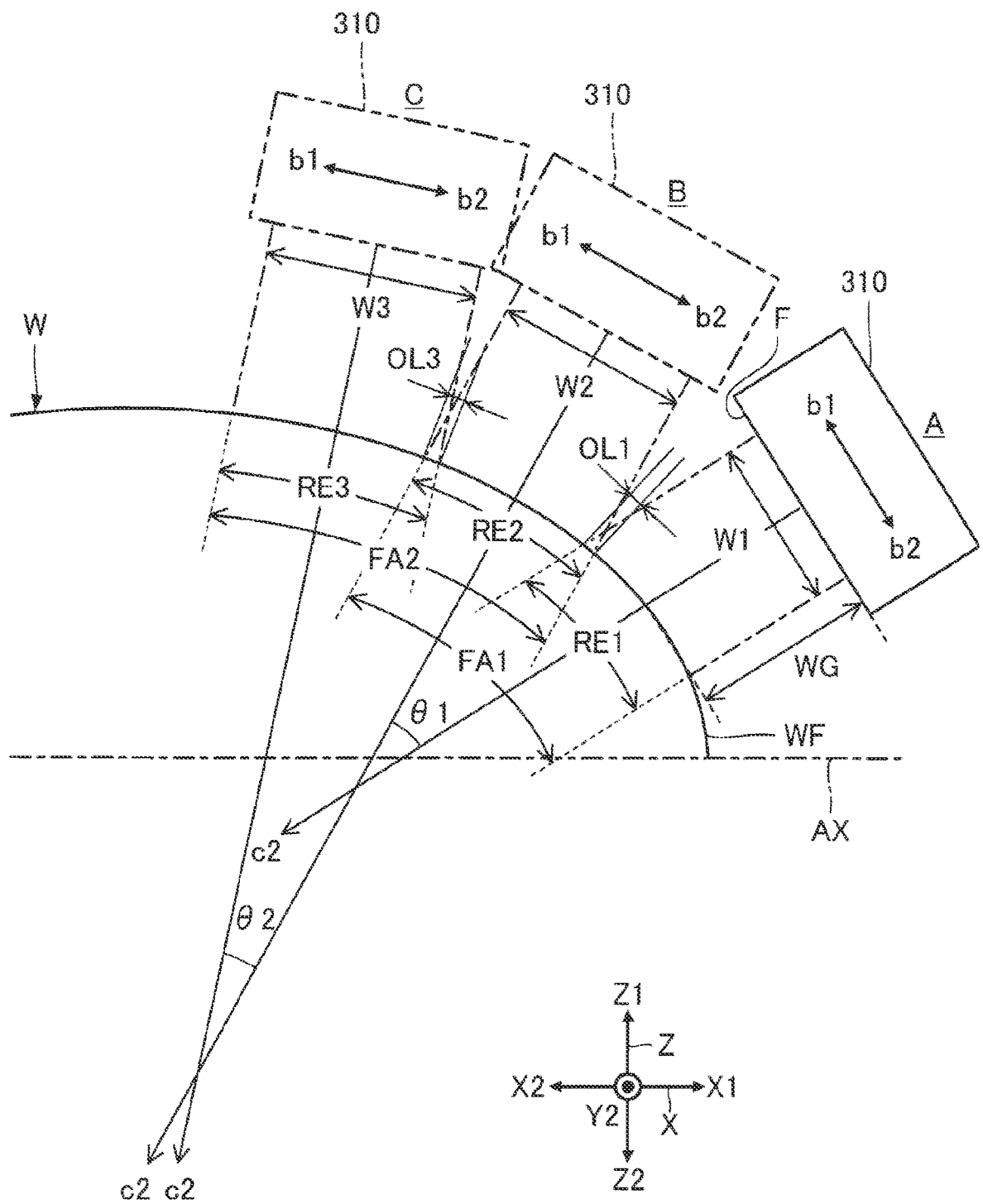
FIG. 9 is a diagram for describing a width of each region that is a printing target and an overlapping width between regions according to Modified Example 1.

FIG. 9 is a diagram for describing the width of each region that is a printing target and an overlapping width between regions according to Modified Example 1. Modified Example 1 illustrated in FIG. 9 is the same as the above-described embodiment except that the number of the passes is reduced.

A printing operation for the workpiece W in Modified Example 1 includes the first step of performing the pass A which is an example of the "first pass", the second step of performing the pass B which is an example of the "second pass", and the third step of performing the pass C which is an example of the "third pass". In Modified Example 1, the second region which is a printing region of the pass B doubles as the "third region" of the main embodiment, and the second pass doubles as the "third pass" of the main embodiment. Therefore, the second step doubles as the "third step" of the main embodiment.

Here, the curvature of the surface FA1 including the regions RE1 and the regions RE2 is larger than the curvature of a surface FA2 including the region RE2 and the region RE3. Further, the overlapping width OL1 between the region RE1 and the region RE2 is smaller than an overlapping width OL3 between the region RE2 and the region RE3. Therefore, it is possible to improve the printing speed without making the printing error at seams formed by each overlapping conspicuous.

2-2. Modified Example 2

In the above-described embodiment, the configuration in which the six-axis vertical articulated robot is used as the moving mechanism has been described by way of example. However, the present disclosure is not limited to the configuration. It is sufficient that the moving mechanism can three-dimensionally change the relative position and posture of the liquid ejecting head with respect to the workpiece. Therefore, the moving mechanism may be, for example, a vertical articulated robot other than the six-axis vertical articulated robot, or may be a horizontal articulated robot. Further, a movable portion of the robot arm is not limited to a rotating mechanism, and may be, for example, an extension mechanism. Further, in the above-described embodiment, the moving mechanism configured to move the liquid ejecting head has been described by way of example. However, the present disclosure is not limited to the configuration, and the present disclosure can also be applied to, for example, a configuration in which the position of the liquid ejecting head is fixed, and the moving mechanism moves the workpiece to three-dimensionally change the relative position and posture of the workpiece with respect to the liquid ejecting head.

2-3. Modified Example 3

In the above-described embodiment, the configuration in which the printing is performed by using one type of ink has been described by way of example. However, the present disclosure is not limited to the configuration, and the present disclosure can also be applied to a configuration in which the printing is performed by using two or more types of ink.

2-4. Modified Example 4

The use of the three-dimensional object printing apparatus according to the present disclosure is not limited to printing. For example, the three-dimensional object printing apparatus that ejects a solution of a coloring material is used as a producing apparatus that forms a color filter of a liquid crystal display device. Further, the three-dimensional object printing apparatus that ejects a solution of a conductive material is used as a producing apparatus that forms a wiring or electrode of a wiring substrate.

What is claimed is:
1. A three-dimensional object printing apparatus comprising:
    a liquid ejecting head that ejects liquid toward a three-dimensional work having a curved surface; and
    a moving mechanism that changes a relative position and posture of the liquid ejecting head with respect to a workpiece,
    wherein a printing operation for the workpiece includes:
        a first step of performing a first pass in which the liquid ejecting head ejects the liquid toward a first region of the workpiece while the moving mechanism moves the liquid ejecting head relative to the first region along a scanning direction;

a second step of performing a second pass in which the liquid ejecting head ejects the liquid toward a second region that partially overlaps the first region of the workpiece while the moving mechanism moves the liquid ejecting head relative to the second region;

a third step of performing a third pass in which the liquid ejecting head ejects the liquid toward a third region of the workpiece while the moving mechanism moves the liquid ejecting head relative to the third region; and a fourth step of performing a fourth pass in which the liquid ejecting head ejects the liquid toward a fourth region that partially overlaps the third region of the workpiece while the moving mechanism moves the liquid ejecting head relative to the fourth region, an angle formed by a direction in which the liquid is ejected from the liquid ejecting head in the first step and a direction in which the liquid is ejected from the liquid ejecting head in the second step when viewed in a cross section perpendicular to the scanning direction as a first angle, and an angle formed by a direction in which the liquid is ejected from the liquid ejecting head in the third step and a direction in which the liquid is ejected from the liquid ejecting head in the fourth step when viewed in the cross section as a second angle, the first angle is larger than the second angle, and an overlapping width between the first region and the second region is smaller than an overlapping width between the third region and the fourth region.

2. The three-dimensional object printing apparatus according to claim 1, wherein
a curvature of a surface including the first region and the second region is larger than a curvature of a surface including the third region and the fourth region when viewed in the cross section.

3. The three-dimensional object printing apparatus according to claim 1, wherein the first pass and the second pass are consecutively performed.

4. The three-dimensional object printing apparatus according to claim 1, wherein the third pass and the fourth pass are consecutively performed.

5. The three-dimensional object printing apparatus according to claim 1, wherein the first pass, the second pass, the third pass, and the fourth pass are performed in this order.

6. The three-dimensional object printing apparatus according to claim 1, wherein a total of a width of the first region and a width of the second region is smaller than a total of a width of the third region and a width of the fourth region.

7. The three-dimensional object printing apparatus according to claim 6, wherein $W1<W2 \leq W3<W4$, in which the width of the first region is $W1$, the width of the second region is $W2$, the width of the third region is $W3$, and the width of the fourth region is $W4$.

8. The three-dimensional object printing apparatus according to claim 1, wherein the second region doubles as the third region,
the second pass doubles as the third pass, and
the second step doubles as the third step.

9. The three-dimensional object printing apparatus according to claim 1, wherein the moving mechanism is an articulated robot on which an end effector including the liquid ejecting head is mounted.

10. The three-dimensional object printing apparatus according to claim 1, wherein the liquid ejecting head includes a plurality of nozzles constituting nozzle rows, and
among the plurality of nozzles, a nozzle that satisfies a relation of $WG \leq SWG$ ejects the liquid, and a nozzle that satisfies a relation of $WG>SWG$ does not eject the liquid, in which a distance between each of the plurality of nozzles and the workpiece in a liquid ejecting direction is $WG$, and a threshold value is $SWG$.

11. The three-dimensional object printing apparatus according to claim 10, wherein a width of at least one of the first region, the second region, the third region, or the fourth region is determined based on the distance between each of the plurality of nozzles and the workpiece in the liquid ejecting direction and the threshold value.

12. The three-dimensional object printing apparatus according to claim 10, wherein the distance between each of the plurality of nozzles and the workpiece in the liquid ejecting direction is calculated based on curvature information regarding a curvature of the curved surface of the workpiece and arrangement information regarding arrangement of the plurality of nozzles.

13. The three-dimensional object printing apparatus according to claim 12, wherein the curvature information is information indicating a three-dimensional shape of the workpiece, or information obtained by measurement of a sensor that measures a distance between the liquid ejecting head and the workpiece.

14. The three-dimensional object printing apparatus according to claim 1, wherein the liquid ejecting head includes a plurality of nozzles constituting nozzle rows, and
a difference between a minimum value and a maximum value of a distance between each of the plurality of nozzles and the workpiece in a liquid ejecting direction in the first step and the second step is larger than a difference between a minimum value and a maximum value of a distance between each of the plurality of nozzles and the workpiece in a liquid ejecting direction in the third step and the fourth step.

15. The three-dimensional object printing apparatus according to claim 1, wherein the first region and the second region overlap each other in a direction intersecting a direction in which the liquid ejecting head moves relative to the workpiece in the first pass or the second pass, and
the third region and the fourth region overlap each other in a direction intersecting a direction in which the liquid ejecting head moves relative to the workpiece in the third pass or the fourth pass.

\* \* \* \* \*